United States Patent [19]

Beffa

[11] 4,311,641
[45] Jan. 19, 1982

[54] CHROMIUM COMPLEXES OF MIXED AZO COMPOUNDS

[75] Inventor: Fabio Beffa, Riehen, Switzerland

[73] Assignee: Ciba-Geigy Corporation, Ardsley, N.Y.

[21] Appl. No.: 74,206

[22] Filed: Sep. 10, 1979

[30] Foreign Application Priority Data

Sep. 20, 1978 [CH] Switzerland .................. 9845/78

[51] Int. Cl.$^3$ .................. C09B 45/06; C09B 45/26; C09D 45/48; D06P 1/10
[52] U.S. Cl. .................. 260/145 A; 260/145 B; 260/145 C; 260/146 R; 260/146 D; 260/147; 260/148; 260/149; 260/150; 260/151; 260/154; 260/159; 260/166; 260/168; 260/174; 260/176; 260/177; 260/178; 260/179; 260/180; 260/184; 260/186; 260/187
[58] Field of Search .......... 260/145 C, 145 B, 145 A, 260/146 R, 147, 148, 146 D

[56] References Cited

U.S. PATENT DOCUMENTS

| | | | |
|---|---|---|---|
| 2,491,928 | 12/1949 | Miller et al. | 260/145 C |
| 2,933,488 | 4/1960 | Biedermann et al. | 260/145 B |
| 3,391,132 | 7/1968 | Beffa et al. | 260/145 B |
| 3,459,727 | 8/1969 | Steiner et al. | 260/145 B |
| 4,033,942 | 7/1977 | Beffa et al. | 260/145 A |
| 4,052,374 | 10/1977 | Baumann | 260/145 A |

Primary Examiner—Floyd D. Higel
Attorney, Agent, or Firm—Edward McC. Roberts

[57] ABSTRACT

The invention relates to chromium complex dyes which, in the form of the free acid, have the formula

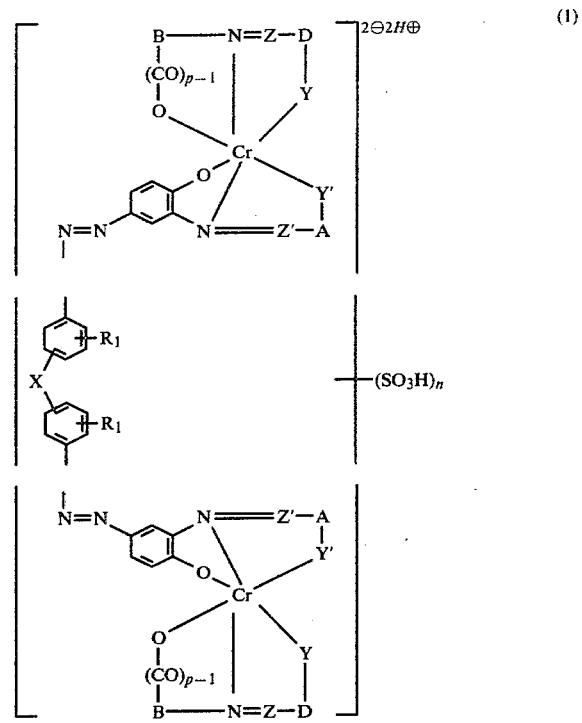

wherein X is a direct bond or a bridge member, each of Z and Z' independently is a nitrogen atom or a —CH-group, p is 1 or 2, each of Y and Y' independently is an oxygen atom or a group of the formula —NR—, wherein R is hydrogen or low molecular alkyl, with the proviso that if Z or Z' is a —CH-group, Y or Y' must be an oxygen atom, $R_1$ is hydrogen or a substituent, B is a benzene or naphthalene radical, A is the radical of an o-hydroxyaldehyde if Z' is the —CH-group or, if Z' is a nitrogen atom, A is the radical of a coupling component which couples in the ortho-position to Y', D is the radical of an o-hydroxyaldehyde if Z is the —CH-group or, if Z is a nitrogen atom, D is the radical of a coupling component which couples in the ortho-position to Y, and n is an integer from 1 to 10. The invention also relates to the manufacture of these dyes by metallization and to their use for dyeing polyamide, in particular leather.

9 Claims, No Drawings

CHROMIUM COMPLEXES OF MIXED AZO COMPOUNDS

The present invention relates to chromium complex dyes which, in the form of the free acid, have the formula

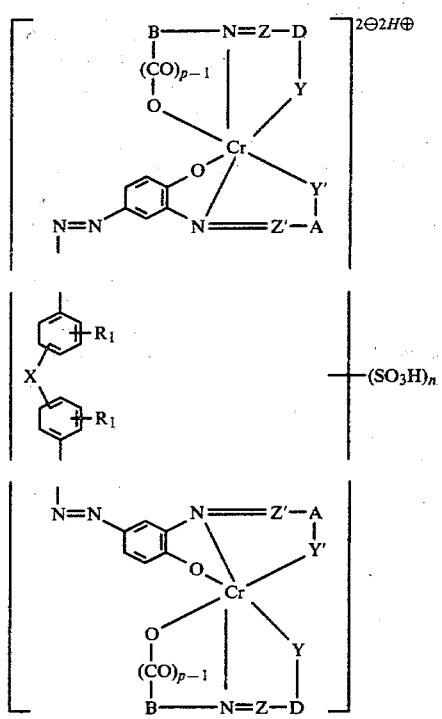

(1)

wherein X is a direct bond or a bridge member, each of Z and Z' independently is a nitrogen atom or a —CH-group, p is 1 or 2, each of Y and Y' independently is an oxygen atom or a group of the formula —NR—, wherein R is hydrogen or low molecular alkyl, with the proviso that if Z or Z' is a —CH-group, Y or Y' must be an oxygen atom, $R_1$ is hydrogen or a substituent, B is a benzene or naphthalene radical, A is the radical of an o-hydroxyaldehyde if Z' is the —CH-group or, if Z' is a nitrogen atom, A is the radical of a coupling component which couples in the ortho-position to Y', D is the radical of an o-hydroxyaldehyde if Z is the —CH-group or, if Z is a nitrogen atom, D is the radical of a coupling component which couples in the ortho-position to Y, and n is an integer from 1 to 10.

A bridge member X can be in particular a methylene bridge which is unsubstituted or substituted by low molecular alkyl, for example —CH$_2$—, —C(CH$_3$)$_2$—,

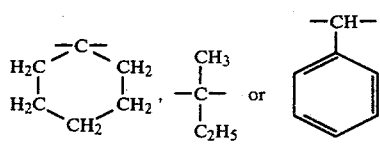

or bridge members, such as —O—, —S—, —NR'—, —SO—, —SO$_2$—, —CO—, —CO—CO—, —SO$_2$NH—, —SO$_2$—NR'—SO$_2$—, —N=N—, —CH$_2$—CH$_2$— or —CH=CH—, wherein R' is hydrogen or low molecular alkyl.

In addition to hydrogen, $R_1$ can be in particular the sulfo and carboxyl group, halogen, especially chlorine, and low molecular alkyl or alkoxy.

Throughout this specification, the term "low molecular" denotes radicals containing 1 to 5 carbon atoms. The radicals B can carry one or more sulfo groups and, in addition, be further substituted, for example by low molecular alkyl, alkoxy, alkylsulfonyl, sulfamoyl, low molecular N-alkylsulfamoyl or N,N-dialkylsulfamoyl, chlorine, bromine, nitro, cyano, arylazo, especially phenylazo, sulfophenylazo or sulfonaphthylazo and arylazoaryleneazo, in particular sulfophenylazophenyleneazo or sulfonaphthylazophenyleneazo.

Preferably, Z is a nitrogen atom and the radical —D—Y— is derived in particular from the following coupling components: phenols, naphthols, naphthylamines, pyrazolones, pyrazolimines, pyridones and acetoacetamides, especially acetoacetanilides, and barbituric acid derivatives and oxyquinolines.

The radicals A are preferably o-phenylene radicals which are unsubstituted or substituted by arylazo or arylazoaryleneazo if Z' is the —CH-group and Y' is an oxygen atom. Possible arylazo groups in this connection are in particular phenylazo and naphthylazo groups which are unsubstituted or substituted by sulfo, chlorine, bromine, nitro, methoxy and/or methyl or ethyl, and arylene is most preferably phenylene.

If Z' is a nitrogen atom, then A—Y' is preferably the radical of a phenol, naphthol, pyrazolone, pyridone or acetoacetanilide. Examples of such coupling components are listed later on in this specification.

The invention relates in particular to compounds of the formula (1), wherein each of Y and Y' independently is an oxygen atom or the —NH-group and, most particularly, to chromium complex dyes which, in the form of the free acid, have the formula

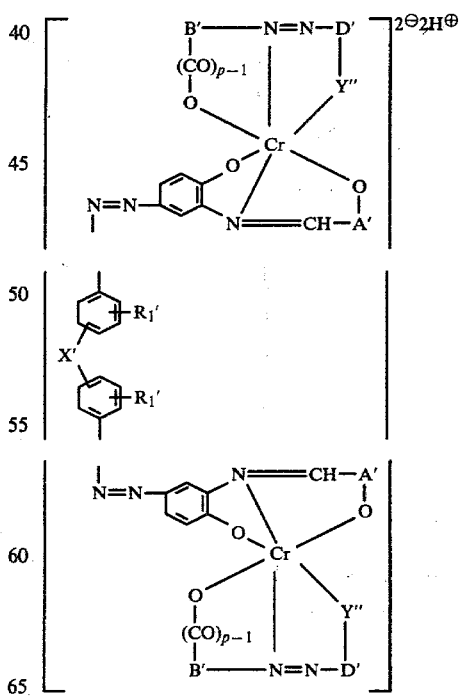

(2)

wherein X' is a direct bond or a bridge of the formula —CH$_2$—,

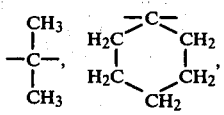 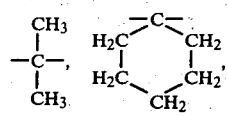

—CH=CH—, —SO₂— or —SO₂—NH—SO₂—, $R_1'$ is hydrogen, the sulfo group, chlorine, methyl or methoxy, p is 1 or 2, A' is an o-phenylene radical which is unsubstituted or substituted by arylazo or arylazoaryleneazo, B' is a phenyl or naphthyl radical which is unsubstituted or substituted by sulfo, arylazo, arylazoaryleneazo, alkyl or alkoxy groups, chlorine, bromine, nitro or cyano, and D'—Y" is the radical of a phenol which is unsubstituted or substituted by hydroxyl, alkyl or alkoxy, the radical of a naphthol which is unsubstituted or substituted by amino, sulfo, chlorine or acylamino, or of a naphthylamine which is unsubstituted or substituted by sulfo, the radical of a 1-aryl-3-methylpyrazol-5-one or the radical of an acetoacetanilide which is unsubstituted or substituted in the anilide nucleus by sulfo, nitro, chlorine, bromine, alkyl or alkoxy. By alkyl and alkoxy are meant in this connection low molecular radicals. Acylamino denotes low molecular alkanoylamino, alkylsulfonylamino and alkoxycarbonylamino radicals and aroylamino and arylsulfonylamino radicals, and the term aryl comprises in particular naphthyl, naphthyl substituted by 1 to 3 sulfo groups and also in particular phenyl and phenyl which is substituted by chlorine, bromine, methyl, ethyl, methoxy, nitro or sulfo.

A further group of dyes consists of those of the formula

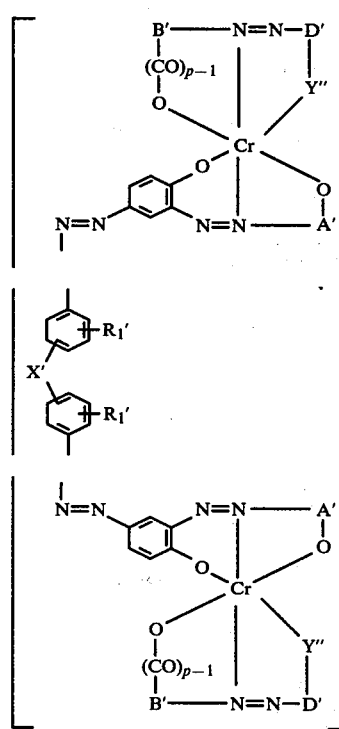

wherein X' is a direct bond or a bridge of the formula —CH₂—,

—CH=CH—, —SO₂— or —SO₂—NH—SO₂—, $R_1'$ is hydrogen, the sulfo group, chlorine, methyl or methoxy, p is 1 or 2, A'—O is the radical of a naphthol which is unsubstituted or substituted by sulfo, the radical of a 1-aryl-3-methylpyrazol-5-one or the radical of an acetoacetanilide which is unsubstituted or substituted in the anilide nucleus by sulfo, nitro, chlorine, bromine, alkyl or alkoxy, B' is a phenyl or naphthyl radical which is unsubstituted or substituted by sulfo, arylazo, arylazoaryleneazo, alkyl or alkoxy groups, chlorine, bromine, nitro or cyano, and D'—Y" is the radical of a phenol which is unsubstituted or substituted by hydroxyl, alkyl or alkoxy, the radical of a naphthol which is unsubstituted or substituted by amino, sulfo, chlorine or acylamino, or of a naphthylamine which is unsubstituted or substituted by sulfo, the radical of a 1-aryl-3-methylpyrazol-5-one or the radical of an acetoacetanilide which can be substituted in the anilide nucleus by sulfo, nitro, chlorine, bromine, alkyl or alkoxy.

The dyes of the formula (1) are obtained by reacting a dye of the formula

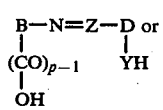

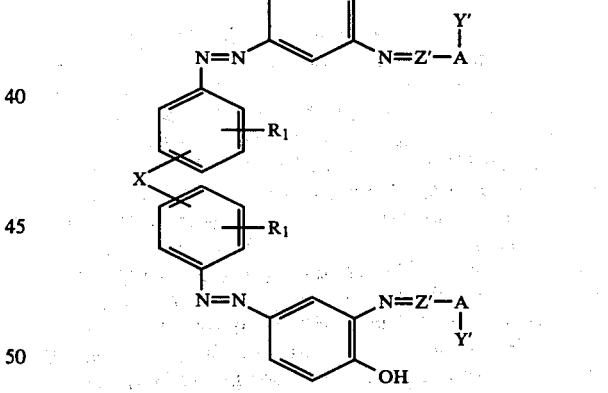

wherein $R_1$, X, Y, Y', Z, Z', A, B, D and p are as defined for formula (1), with a chromium donor to produce the 1:1 chromium complex or, in the case of the formula (5), the 1:2 chromium complex, and subsequently reacting this latter with the non-metallised compound of the formula (5) or (4), the starting materials being chosen such that they contain 2 to 8 sulfo groups, and ensuring that the molar ratio of the compound of the formula (4) to that of the formula (5) is 2:1.

Preferably, the 1:1 chromium complex of the compound of the formula (4) is prepared first and then 2 equivalents thereof are reacted with one equivalent of the compound of the formula (5).

If the compound of the formula (5) is a bisazomethine, this latter is advantageously prepared in situ in the reaction mixture. The procedure is that 2 equivalents of the 1:1 chromium complex of the dye of the formula (4) are reacted with a mixture of 1 equivalent of a dihydroxydiamine of the formula

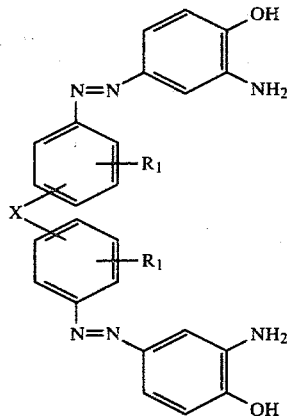

(6)

and 2 equivalents of an aldehyde of the formula

HO—A—CHO (7)

wherein X and $R_1$ are as defined for formula (1), and A is an o-phenylene radical which is unsubstituted or substituted by arylazo or arylazoaryleneazo.

If the compound of the formula (1) is a tetrazo compound, it has the formula

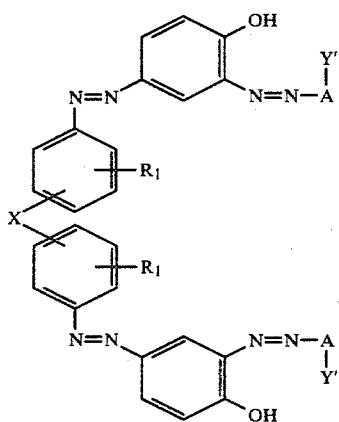

(8)

wherein A—Y' is the radical of a phenol, naphthol, pyrazolone, pyridone or acetoacetanilide, and X and $R_1$ are as defined for formula (1), and 1 equivalent thereof is reacted with 2 equivalents of the 1:1 chromium complex of the compound of the formula (4).

A preferred group of dyes of the present invention comprises those wherein X is a direct bond, a —$SO_2$—, vinylene or cyclohexylene bridge, as particularly interesting compounds can be obtained with these types.

Further preferred compounds are those of the formula (2), wherein the substituents $R_1'$ represent hydrogen or sulfo, as these compounds can be especially easily obtained.

The starting compounds of the formula (4) are obtained in conventional manner. If Z is a nitrogen atom, an amine of the formula HO—(CO)$_{p-1}$—B—NH$_2$ (9)

is diazotised and the diazo intermediate is coupled to a coupling component of the formula

H—D—YH (10)

Examples of suitable diazo components of the formula (9) are: anthranilic acid, 4- or 5-sulfo- and 4- or 5-sulfamoyl-anthranilic acid, 2-amino-1-hydroxybenzene, 4-chloro- and 4,6-dichloro-2-amino-1-hydroxybenzene, 4- or 5-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxybenzene-5-methyl- and -5-benzylsulfone, 2-amino-1-hydroxybenzene-4-methyl-, -ethyl-, -chloromethyl- and -butylsulfone, 5-nitro- and 6-nitro-2-amino-1-hydroxybenzene-4-methylsulfone, 2-amino-1-hydroxybenzene-4- or -5-sulfonamide, 2-amino-1-hydroxybenzene-4- or -5-sulfo-N-methyl- and -sulfo-N-β-hydroxyethylamide, 2-amino-1-hydroxybenzene-4-sulfanilide, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 4-nitro-2-amino-1-hydroxybenzene-6-sulfonamide, 2-amino-1-hydroxybenzene-4- or -5-sulfanthranilide, 2-amino-1-hydroxybenzene-4- or -5-sulfonic acid, 4-nitro-2-amino-1-hydroxybenzene-6-sulfonic acid, 5-nitro- or 6-nitro-2-amino-1-hydroxybenzene-4-sulfonic acid, 1-amino-2-hydroxynaphthalene-4-sulfonic acid, 1-amino-2-hydroxy-6-nitronaphthalene-4-sulfonic acid, 4-(4'- or 3'-sulfophenylazo)-2-amino-1-hydroxybenzene, 4-(3'-sulfonamidophenylazo)-2-amino-1-hydroxybenzene, 4-(4'-phenylazophenylazo)-2-amino-1-hydroxybenzene, 2-amino-1-hydroxybenzene-4,6-disulfonic acid.

Particularly interesting compounds are those wherein B or B' is a phenyl or naphthyl radical which contains nitro and/or sulfo groups.

The radical D or D' is derived in particular from the following groups of coupling components:

Naphthols which are unsubstituted or substituted by chlorine, acylamino, amino, sulfo, sulfamoyl, N-monosubstituted or N,N'-disubstituted sulfamoyl groups and sulfone groups, said groups having the same meanings as given previously.

Naphthylamines which are unsubstituted or substituted by sulfo, sulfamoyl, mono- or disubstituted sulfamoyl or sulfone groups.

5-Pyrazolones or 5-aminopyrazolones which in position 1 preferably contain a phenyl or naphthyl radical which is unsubstituted or substituted by chlorine, nitro, low molecular alkyl and alkoxy groups, sulfamoyl, N-alkylated sulfamoyl groups, sulfone or, in particular, sulfo groups.

Acetoacetanilides and benzoylacetanilides which can be substituted in the anilide nucleus by chlorine, bromine, low molecular alkyl, alkoxy, sulfone, sulfamoyl, N-mono-substituted or N,N-disubstituted sulfamoyl groups.

Phenols which are substituted by low molecular acylamino groups and/or alkyl groups preferably containing 1 to 5 carbon atoms and which couple in the ortho-position.

2,6-Dihydroxy-3-cyano- or -carbamoyl-4-alkylpyridine and 6-hydroxy-2-pyridones which in position 1 are substituted by low molecular substituted or unsubstituted alkyl, for example methyl, isopropyl, β-hydroxyethyl, β-aminoethyl or γ-isopropoxypropyl, and which in position 3 carry a cyano or carbamoyl group and, in position 4, a low molecular alkyl group, in particular methyl.

Barbituric acid and barbituric acids which are substituted at the nitrogen atoms by low molecular alkyl or aryl, in particular phenyl. Dioxyquinolines.

Examples of such coupling components are:
2-naphthol, 1,3- or 1,5-dihydroxynaphthalene, 2-naphthol-6-sulfonamide, 2-naphthol-6-β-hydroxyethylsulfone, 1-naphthol, 1-acetylamino-7-naphthol, 1-propionylamino-7-naphthol, 1-carbomethoxyamino-7-naphthol, 1-carboethoxyamino-7-naphthol, 1-carbopropoxyamino-7-naphthol, 1-dimethylaminosulfonylamino-7-naphthol, 6-acetyl-2-naphthol, 2-naphthol-3-, -4-, -5-, -6-, -7- or -8-sulfonic acid, 1-naphthol-3-, -4- or -5-sulfonic acid, 4-methyl-1-naphthol, 4-methoxy-1-naphthol, 4-acetyl-1-naphthol, 1-naphthol-3-, -4- or -5-sulfonamide, 2-naphthol-3-, -4-, -5-, -6-, -7- or -8-sulfonamide, 5,8-dichloro-1-naphthol, 5-chloro-1-naphthol, 2-naphthylamine, 2-naphthylamine-1-sulfonic acid, 1-naphthylamine-4- or -5-sulfonic acid, 2-aminonaphthalene-7-sulfonic acid, 1-naphthylamine-4-sulfonamide, 2-aminonaphthalene-6-sulfonamide, 2-aminonaphthalene-6-sulfonic acid N-methylamide or -6-sulfonic acid, 1,3-dimethylpyrazol-5-one, 1-phenyl-3-methylpyrazol-5-one, 1-phenyl-5-pyrazolone-3-carbamoyl, 1-(2'-, 3'- or 4'-methylphenyl)-3-methylpyrazol-5-one, 1-[3'- or 4'-(β-hydroxyethylsulfonyl)-phenyl]-3-methylpyrazol-5-one, 1-(2'-, 3'- or 4'-sulfophenyl)-3-methylpyrazol-5-one, 1-(2'-chloro-5'-sulfophenyl)-3-methylpyrazol-5-one, 1-(2'- or 4'-methoxyphenyl)-3-methylpyrazol-5-one, 1-γ2'-, 3'- or 4'-chlorophenyl)-3-methylpyrazol-5-one, 1-(2'-, 3'- or 4'-nitrophenyl)-3-methylpyrazol-5-one, 1-(2'-, 5' or 3'-, 4'-dichlorophenyl)-3-methylpyrazol-5-one, 1-(2'-, 3'- or 4'-sulfamoylphenyl)-3-methylpyrazol-5-one, 1-(2',5'-dichloro-4'-sulfophenyl)-3-methylpyrazol-5-one, 1-(2'-, 3'- or 4'-methylsulfonylphenyl)-3-methyl-pyrazol-5-one, 1-(2'-, 3'- or 4'-sulfophenyl)-3-methyl-5-aminopyrazole, 1-(2'-chloro-5'-sulfophenyl)-3-methyl-5-aminopyrazole, acetoacetanilide, acetoacetanilide-4-sulfonic acid, acetoaceto-o-anisidide, acetoaceto-o-toluidide, acetoaceto-o-chloroanilide, acetoacetanilide-3- or -4-sulfonamide, acetoaceto-m-xylidide, tetralol, 4-methylphenol, 3-dialkylaminophenol, in particular 3-dimethylamino- and 3-diethylaminophenol, 4-butylphenol, 4-amylphenol, in particular 4-t-amylphenol, 2-isopropyl-4-methylphenol, 2- or 3-acetylamino-4-methylphenol, 2-methoxycarbonylamino-4-methylphenol, 2-ethoxycarbonylamino-4-methyl.

Preferably, the radicals D—Y and D'—Y" are naphthol radicals which are unsubstituted or substituted by sulfo or by amino and sulfo, phenol radicals which are unsubstituted or substituted by low molecular alkyl, the acetoacetanilide or acetochloroanilide radical or a 1-phenyl-3-methylpyrazol-5-one radical which can additionally be substituted in the phenyl nucleus by sulfo or chlorine or by sulfo and chlorine.

If Z is a —CH—group, an amine of the formula (9) is reacted with an o-hydroxybenzaldehyde or o-hydroxynaphthaldehyde. Examples of suitable aldehydes are: 2-hydroxy-1-naphthaldehyde, 1-hydroxy-2-naphthaldehyde, 2-hydroxybenzaldehyde, 3- and 5-methyl-2-hydroxybenzaldehyde, 3,5-dimethyl-2-hydroxybenzaldehyde, 5-butyl-2-hydroxybenzaldehyde, 5-chloro- or 5-bromo-2-hydroxybenzaldehyde, 3-chloro-2-hydroxybenzaldehyde, 3,5-dichloro-2-hydroxybenzaldehyde, 5-sulfo-2-hydroxybenzaldehyde, 3-methyl-5-chloro-2-hydroxybenzaldehyde.

If desired, these aldehydes can be additionally substituted by an arylazo or arylazoaryleneazo group. The terms "arylazo" and "arylazoaryleneazo" have in this context the same meanings as in the definition of formula (1).

The dihydroxydiamino compounds of the formula (6) are obtained by tetrazotising a diamine of the formula

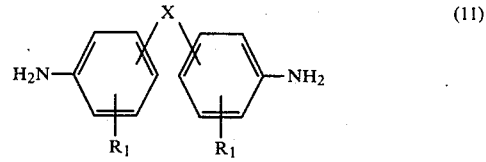
(11)

and coupling it in alkaline medium with 2 equivalents of a 2-acylamino-1-hydroxybenzene and subsequently saponifying the acylamino groups. The acyl group is preferably the acetyl group.

Examples of suitable diamines of the formula (11) are: 4,4'-diaminodiphenyl, 2,2'-diaminodiphenyl-4,4'-disulfonic acid, 4,4'-diaminodiphenyl-3-sulfonic acid, 4,4'-diaminodiphenyl-2,2'- or -3,3'-disulfonic acid, 4,4'-diamino-3,3'-dimethoxydiphenyl, 4,4'-diamino-3,3'- or -2,2'-dimethyldiphenyl, 3,3'- or 4,4'-diaminodiphenylsulfone, 4,4'-diaminobenzophenone, 4,4'-diaminodiphenyl ether, 4,4'-diaminodiphenylsulfide, 4,4'-diaminodiphenylsulfoxide, 4,4'-diaminodiphenylamine, 4,4'-diaminodiphenyl-2-sulfonic acid, 4,4'-diaminobenzile, 3,3'- or 4,4'-diaminobenzanilide, 3,3'-diaminobenzanilide-4-sulfonic acid, 4,4'-diaminobenzanilide-3-sulfonic acid, 3,3'- or 4,4'-diaminodiphenyl urea, 4,4'-diaminodiphenyl urea-3,3'-disulfonic acid, 4,4'-diaminodiphenyl thiourea, 4,4'-diaminobenzene sulfanilide, 3,3'- or 4,4'-diaminodiphenyldisulfimide, 4,4'-dichloro-3,3-diaminodiphenyldisulfimide, 4,4'-diaminoazobenzene, 4,4'-diaminostilbene-2,2'-disulfonic acid, 4,4'-diamino-diphenylmethane, 4,4'-diamino-3,3'-dimethyldiphenylmethane, 3,3'-diamino-4,4'-dimethyldiphenylmethane, 4,4'-diaminotriphenylmethane, 4,4'-diaminodiphenylethane, 4,4'-diamino-3,3'-dimethyldiphenylethane, 2,2-bis-(4'-aminophenyl)-propane, 1,1-bis-(4'-aminophenyl)-cyclohexane and 1,1-bis-(4'-amino-3'-methylphenyl)-cyclohexane.

The o-hydroxybenzaldehydes and o-hydroxynaphthaldehydes cited above are employed as aldehydes of the formula (7). It is preferred to use o-hydroxybenzaldehyde which can be substituted by arylazo or arylazoaryleneazo, the terms "arylazo" and "arylazoaryleneazo" having the same meanings as given in the definition of the formula (1).

The tetrazo compounds of the formula (8) are obtained by diazotising a dihydroxydiamine of the formula (6) and coupling the diazo compound to 2 equivalents of a coupling component of the formula

H—A—Y' (12)

Suitable coupling components of the formula (12) are in particular naphthols, pyrazolones, acetoacetanilides and pyridones. Most preferably they are β-naphthol, 1-aryl-3-methylparazol-5-ones or acetoacetanilides which can be substituted in the anilide nucleus by sulfo, nitro, chlorine, bromine, low molecular alkyl or alkoxy.

Preferably the starting materials are chosen such that the resultant complex contains 2 to 8, in particular 2 to 6, sulfo groups.

The manufacture of the 1:1 chromium complex of the compound of the formula (4) or (5) is carried out by conventional methods which are known per se, for example by reacting said compound in an acid medium with a salt of trivalent chromium, for example chromium formiate, chromium sulfate, chromium chloride hexahydrate or chromium fluoride, at boiling temperature or, if appropriate, at temperatures exceeding 100° C. Trivalent chromium can also be obtained in the reaction mixture from chromium (VI) compounds, for example chromate, by simultaneously adding a reducing agent. The metallising can be carried out in an aqueous, aqueous-organic or in purely organic solvents, such as alcohols or ketones.

The reaction of the 1:1 chromium complex of the dye of the formula (4) or (5) with the metal-free dye of the formula (6) or (4), and the reaction between a 1:1 chromium complex of a dye of the formula (4), a dihydroxydiamine of the formula (6) and an aldehyde of the formula (7), is advantageously carried out in a neutral to weakly alkaline medium, in an open or closed vessel, at elevated temperature, for example in the temperature range between 50° and 120° C., the reaction steps in this latter case being carried out consecutively without isolation of the intermediate.

The process can be carried out in organic solvents, for example alcohols or ketones or in aqueous solution, in which case, if appropriate, the addition of solvents, for example of alcohols, formamide etc., can promote the reaction. It is usually advisable to react if possible stoichiometric amounts of the chromium-containing 1:1 complex and of the metal-free dye, the molecular ratio between metal-free dye and 1:1 chromium complex advantageously being at least 0.85:1 and, at most, 1:0.85. An excess of metal-containing dye is usually less disadvantageous than one of the metal-free dye. The closer this ratio is to 1:1 the more advantageous the result usually is.

Instead of using a homogeneous 1:1 chromium complex, it is also possible to use a mixture of different chromium complexes or a mixture of different dihydroxydiamines, aldehydes and tetrazo compounds.

The chromium-containing mixed complexes of the present invention which can be obtained by the above process are isolated with advantage in the form of their salts, in particular their alkali, for example lithium, salts, in particular sodium salts, or also ammonium salts. They are suitable for dyeing a very wide variety of natural or synthetic polyamide materials, such as wool, synthetic polyamide fibres and, in particular, for dyeing leather. Depending on their constitution, they are also suitable for dyeing cellulosics, for example cotton and paper.

The dyes of the present invention are productive and have good covering power. They have a good exhaustion capacity while at the same time having good fastness properties, such as fastness to washing, water, perspiration, rubbing, diffusion and light. Their good build-up on different types of leather, both on pure chrome-tanned leather and on leather which has been retanned with vegetable or synthetic tannins, is to be particularly mentioned. Strong, orange to brown and olive shades are obtained.

The invention is illustrated by the following Examples, in which the parts and percentages are by weight unless otherwise indicated.

EXAMPLE 1

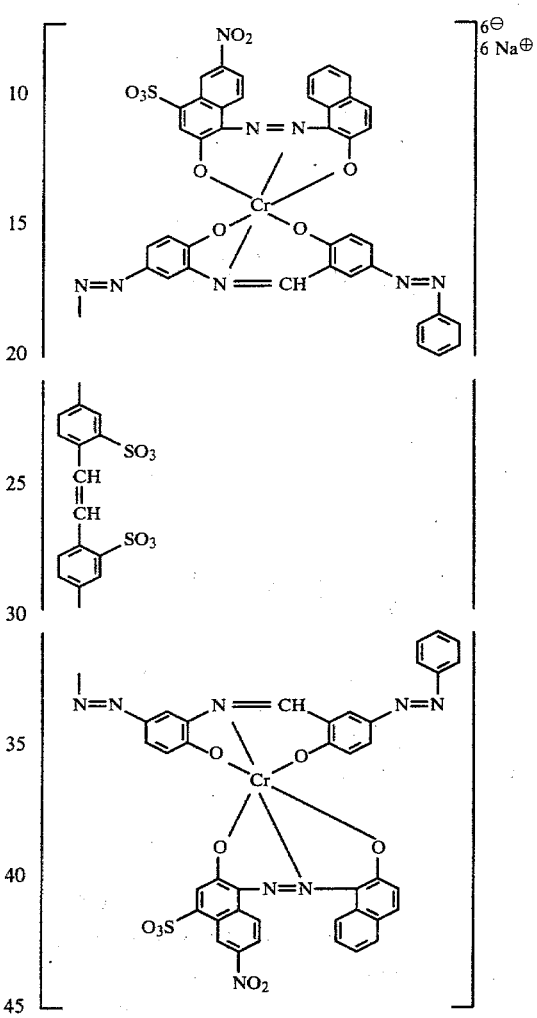

48.9 Parts of the 1:1 chromium complex corresponding to 5.2 parts of chromium and 43.9 parts of the monoazo dye obtained from diazotised 6-nitro-1-amino-2-hydroxynaphthalene-4-sulfonic acid and 2-hydroxynaphthalene are suspended in 750 parts by volume of ethylene glycol with 22.6 parts of the coupling product obtained from diazotised aniline and salicylaldehyde and 30.5 parts of the dihydroxydiamino compound obtained by coupling tetrazotised 4,4'-diaminostilbene-2,2'-disulfonic acid in alkaline medium to 2-acetylamino-1-hydroxybenzene and subsequently saponifying the acetylamino groups with dilute sodium hydroxide solution. The mixture is heated to 80°-85° C. while simultaneously raising the pH of the suspension to 7-7.5 with 5 N sodium hydroxide, and is kept at this temperature and at constant pH with further 5 N sodium hydroxide until the starting materials can no longer be detected. The chromium-containing dye is precipitated with saturated sodium chloride solution, collected by filtration and dried. It is a dark powder which dissolves in water to form a brown solution and colours leather in brown shades of good fastness properties.

EXAMPLE 2

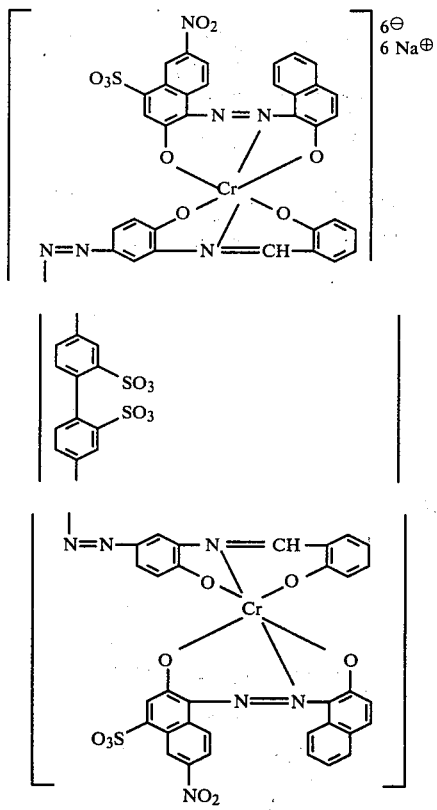

48.9 Parts of the 1:1 chromium complex corresponding to 5.2 parts of chromium and 43.9 parts of the monoazo dye obtained from diazotised 6-nitro-1-amino-2-hydroxynaphthalene-4-sulfonic acid and 2-hydroxynaphthalene are suspended in 1000 parts by volume of water with 12.5 parts of salicylaldehyde and 29.2 parts of the dihydroxydiamino compound obtained by coupling tetrazotised 4,4'-diaminodiphenyl-2,2'-disulfonic acid in alkaline medium to 2-acetylamino-1-hydroxybenzene and subsequently saponifying the acetylamino groups with dilute sodium hydroxide solution. The mixture is heated to 80°-85° C. while simultaneously raising the pH of the suspension to 8-8.5 with 5 N sodium hydroxide, and is kept at this temperature and at constant pH with further 5 N sodium hydroxide until the starting materials can no longer be detected. The chromium-containing dye is precipitated with sodium chloride, collected by filtration and dried. It is a dark powder which dissolves in water to form a brown solution and colours leather in brown shades.

EXAMPLE 3

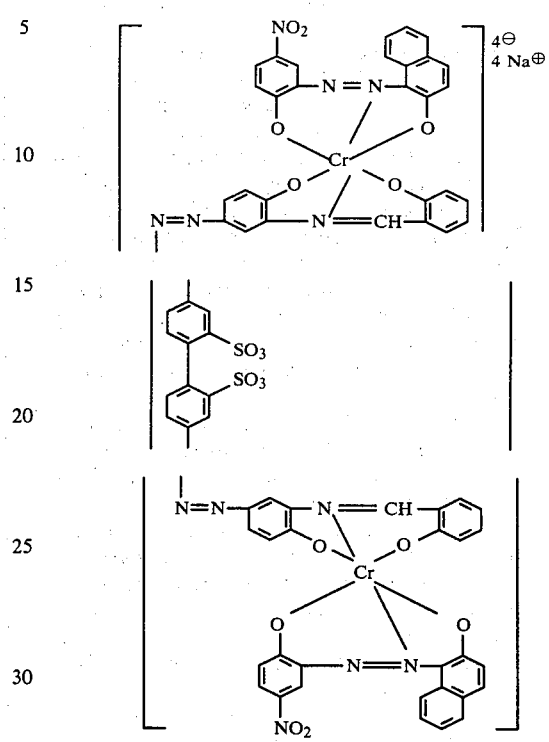

30.9 Parts of the monoazo dye obtained from diazotised 4-nitro-2-amino-1-hydroxybenzene and 2-hydroxynaphthalene are stirred with 26.7 parts of chromium chloride hexahydrate in 700 parts by volume of ethylene glycol at 120°-125° C. until the starting material can no longer be detected. To the resultant solution of the 1:1 chromium complex are then added, at 80°-85° C., 12.5 parts of salicylaldehyde and 29.2 parts of the dihydroxydiamino compound obtained by coupling tetrazotised 4,4'-diamino-diphenyl-2,2'-disulfonic acid to 2-acetylamino-1-hydroxybenzene in alkaline medium and then saponifying the acetylamino groups in alkaline medium. The mixture is kept at this temperature until the addition reaction is complete. The pH of the reaction mixture is simultaneously adjusted to 7.5-8 with 5 N sodium hydroxide and kept thereat. When the reaction is complete, the chromium-containing dye is precipitated with saturated sodium chloride solution, collected by filtration and dried. It is a dark powder which dissolves in water to form a brown solution and dyes leather in brown shades of good fastness properties.

Table 1 lists further dyes of this invention which are obtained by reacting the 1:1 chromium complex of the azo or azomethine compounds of column III with the aldehyde of column II and the dihydroxydiamino compound of column I. These dyes colour leather in the shades indicated in column IV.

TABLE I

| No. | I | II | III | IV |
|---|---|---|---|---|
| 1 | biphenyl-2,2'-disulfonic acid bis-azo coupled to 3-amino-4-hydroxyphenyl groups | salicylaldehyde (2-hydroxybenzaldehyde) | 2-hydroxy-3-sulfo-5-nitrophenyl-azo-(2-hydroxynaphthyl) | brown |
| 2 | " | " | 2-hydroxy-3-sulfo-5-nitrophenyl-azo-pyrazolone (N-phenyl, CH₃) | orange |
| 3 | " | " | 2-hydroxy-3-sulfo-5-nitrophenyl-azo-acetoacetanilide | yellowish orange |
| 4 | biphenyl-2,2'-disulfonic acid bis-azo coupled to 3-amino-4-hydroxyphenyl groups | salicylaldehyde | 3-chloro-2-hydroxy-5-nitrophenyl-azo-(2-hydroxynaphthyl) | brown |
| 5 | " | " | 2-hydroxy-4-nitrophenyl-azo-(2-amino-6-sulfonaphthyl) | olive-brown |
| 6 | " | " | 2-hydroxy-6-nitrophenyl-azo-(2-hydroxy-5-pentylphenyl) | brown |
| 7 | " | 2-hydroxy-5-(phenylazo)benzaldehyde | 2-hydroxy-3-sulfo-6-nitronaphthyl-azo-(2-hydroxynaphthyl) | brown |
| 8 | biphenyl-2,2'-disulfonic acid bis-azo coupled to 3-amino-4-hydroxyphenyl groups | 2-hydroxy-5-(phenylazo)benzaldehyde | 2-hydroxy-3-sulfo-5-nitrophenyl-azo-(2-hydroxynaphthyl) | brown |
| 9 | " | " | 2-hydroxy-3-sulfo-5-nitrophenyl-azo-pyrazolone (N-phenyl, CH₃) | orange |

TABLE 1-continued
| No. | I | II | III | IV |
|---|---|---|---|---|
| 10 | " | " | 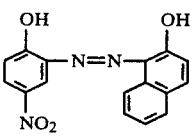 | brown |
| 11 | " | " | 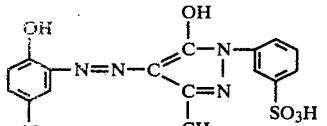 | orange |
| 12 | 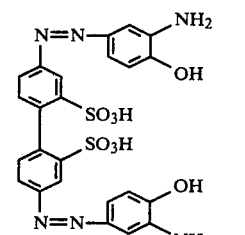 | 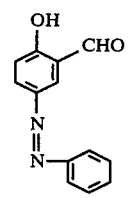 | 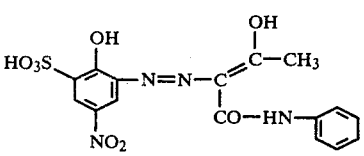 | yellowish orange |
| 13 | " | " | 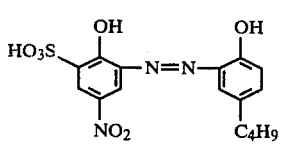 | brown |
| 14 | " | " | 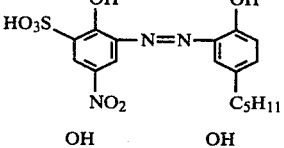 | brown |
| 15 | " | 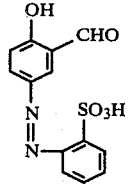 | 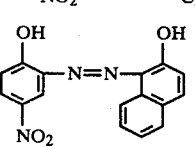 | brown |
| 16 | 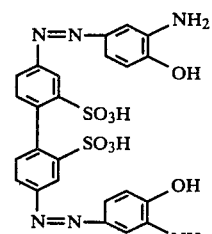 | 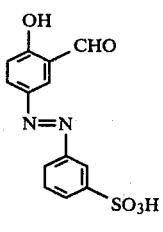 | 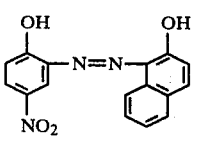 | brown |
| 17 | " | 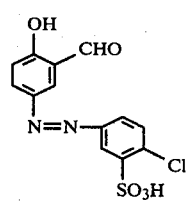 | " | brown |
| 18 | " | 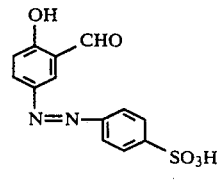 | " | brown |

TABLE 1-continued

| No. | I | II | III | IV |
|---|---|---|---|---|
| 19 | (structure) | (structure) | (structure) | brown |
| 20 | " | (structure) | " | brown |
| 21 | " | (structure) | " | brown |
| 22 | (structure) | (structure) | (structure) | brown |
| 23 | " | " | (structure) | brown |
| 24 | " | " | (structure) | yellowish orange |
| 25 | (structure) | (structure) | (structure) | orange |

TABLE 1-continued
| No. | I | II | III | IV |
|---|---|---|---|---|
| 26 | " | " | 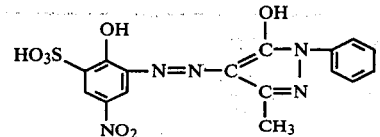 | orange |
| 27 | " | " | 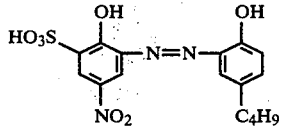 | brown |
| 28 | 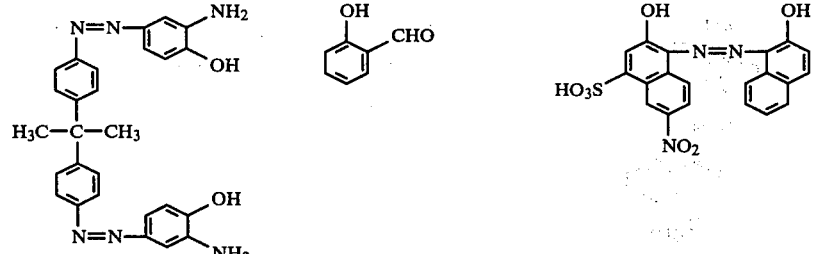 | 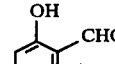 | 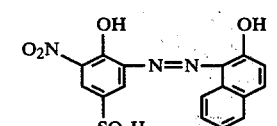 | brown |
| 29 | " | " |  | brown |
| 30 | 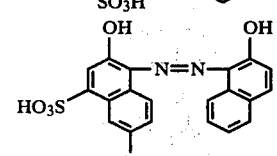 | " | 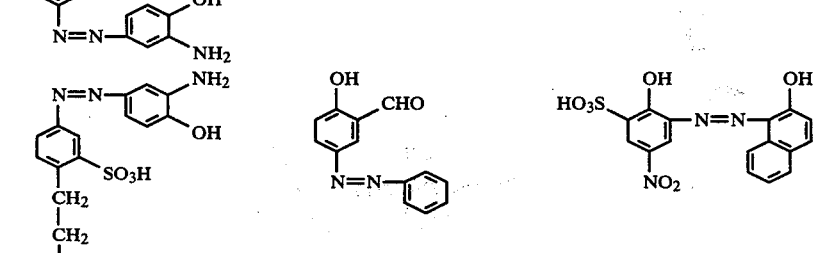 | brown |
| 31 | 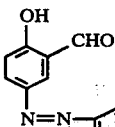 | 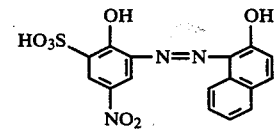 | 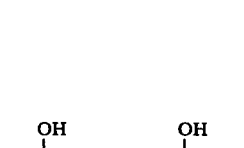 | brown |
| 32 | " | " | 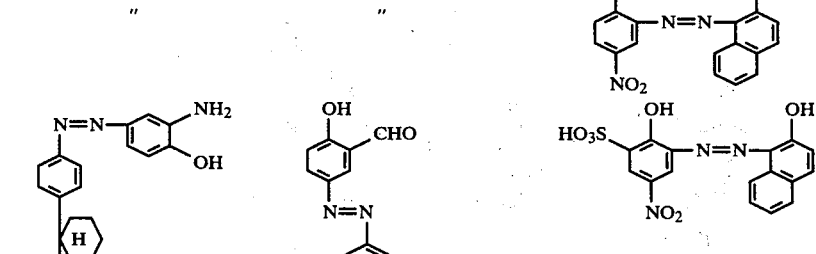 | brown |
| 33 | 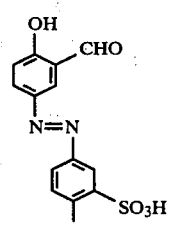 | 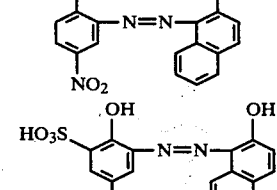 | | brown |

TABLE 1-continued

| No. | I | II | III | IV |
|---|---|---|---|---|
| 34 | (bis-azo compound with cyclohexylidene bridge, NH₂/OH substituents) | 2-hydroxy-5-(azo)-benzaldehyde with 3-methyl-SO₃H | 2-hydroxy-4-nitrophenylazo-1-naphthol | brown |
| 35 | (bis-azo compound with SO₂NH bridge, NH₂/OH substituents) | 2-hydroxybenzaldehyde | 3-HO₃S-2-hydroxy-5-nitrophenylazo-2-naphthol | brown |
| 36 | " | 2-hydroxy-4-methylbenzaldehyde (OH, CHO, CH₃) | " | brown |
| 37 | (bis-azo compound with O-bridge, NH₂/OH substituents) | 2-hydroxy-5-(azo)-3,6-dichloro-benzaldehyde with SO₃H | 3-HO₃S-2-hydroxy-5-nitrophenylazo-2-naphthol | brown |
| 38 | " | 2-hydroxybenzaldehyde (OH, CHO) | " | brown |
| 39 | (bis-azo compound with C(CH₃)₂ bridge, NH₂/OH substituents) | " | " | brown |
| 40 | " | 2-hydroxy-5-(2-sulfophenylazo)-benzaldehyde | " | brown |

TABLE 1-continued

| No. | I | II | III | IV |
|---|---|---|---|---|
| 41 | (bis-azo structure with NH₂, OH groups and SO₂ bridge) | 2-hydroxy-5-[(3-sulfophenyl)azo]benzaldehyde | 1-[(2-hydroxy-5-nitro-3-sulfophenyl)azo]-2-naphthol | brown |
| 42 | " | " | 2-[(2-hydroxy-4,5-dimethylphenyl)azo]-6-nitrophenol | brown |
| 43 | (bis-azo structure with SO₂–NH–SO₂ bridge) | " | 1-[(2-hydroxy-4-nitrophenyl)azo]-2-naphthol derivative | brown |
| 44 | (bis-azo structure with SO₂–NH–SO₂ bridge) | 2-hydroxy-5-[(3-sulfophenyl)azo]benzaldehyde | 3-methyl-1-phenyl-4-[(2-hydroxy-5-sulfamoylphenyl)azo]-5-pyrazolone | orange |
| 45 | (bis-azo structure with SO₂ bridge, meta) | " | " | orange |
| 46 | " | " | 2-[(2-hydroxy-1-naphthyl)azo]-6-nitrophenol | brown |
| 47 | (biphenyl-sulfonic acid bis-azo structure) | salicylaldehyde | 3-methyl-1-phenyl-4-[(2-hydroxy-3-sulfo-5-nitrophenyl)azo]-5-pyrazolone | orange |

TABLE 1-continued

| No. | I | II | III | IV |
|---|---|---|---|---|
| 48 | " | " | [structure: OH, N=N, C-OH, C-CH3, C=N, NH-C6H3(Cl)(SO3H), coupled to 2-hydroxy-5-nitrophenyl] | orange |
| 49 | [structure: 4,4'-biphenylene-bis(azo-3-amino-4-hydroxyphenyl)] | " | " | orange |
| 50 | " | " | [structure: 2-hydroxy-3-sulfo-5-nitrophenyl-N=N-C(OH)=C(CH3)-N=N-phenyl pyrazolone type] | orange |
| 51 | [structure: bis(3-amino-4-hydroxyphenylazo)diphenyl sulfide] | [structure: salicylaldehyde, OH-C6H4-CHO] | [structure: same pyrazolone derivative as 50] | orange |
| 52 | " | " | [structure: 2-hydroxy-3-sulfo-5-nitrophenyl-N=N-2-hydroxynaphthyl] | brown |
| 53 | [structure: stilbene-2,2'-disulfonic acid-4,4'-bis(azo-3-amino-4-hydroxyphenyl)] | " | [structure: 2-hydroxy-4-sulfo-7-nitronaphthyl-N=N-2-hydroxynaphthyl] | brown |
| 54 | [structure: same as 53] | [structure: salicylaldehyde] | [structure: 2-hydroxy-3-sulfo-5-nitrophenyl-N=CH-2-hydroxyphenyl] | orange |
| 55 | " | [structure: 5-(phenylazo)salicylaldehyde] | " | orange |

TABLE 1-continued
| No. | I | II | III | IV |
|-----|---|----|----|-----|
| 56 | " | 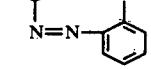 | " | orange |
| 57 | 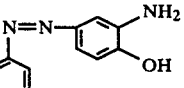 | 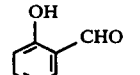 | 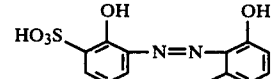 | brown |
| 58 | " | 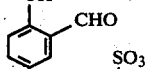 | 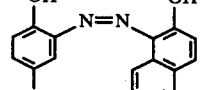 | reddish brown |
| 59 | " | 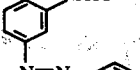 | " | brown |
| 60 | " | " | 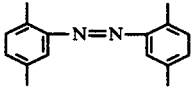 | brown |
| 61 | 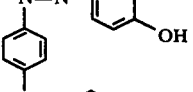 |  | 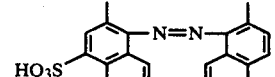 | brown |
| 62 | 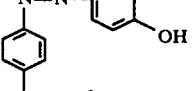 |  | 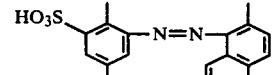 | brown |

TABLE 1-continued

| No. | I | II | III | IV |
|---|---|---|---|---|
| 63 | (structure) | salicylaldehyde | " | brown |
| 64 | (structure) | salicylaldehyde | (structure) | brown |
| 65 | (structure) | (structure) | (structure) | brown |
| 66 | " | (structure) | " | brown |
| 67 | (structure) | (structure) | (structure) | brown |

TABLE 1-continued

| No. | I | II | III | IV |
|---|---|---|---|---|
| 68 | (structure) | (structure) | (structure) | brown |
| 69 | " | (structure) | (structure) | brown |
| 70 | (structure) | (structure) | (structure) | brown |
| 71 | (structure) | (structure) | (structure) | brown |
| 72 | (structure) | (structure) | (structure) | reddish orange |
| 73 | " | " | (structure) | brown |
| 74 | " | " | (structure) | reddish orange |

TABLE 1-continued
| No. | I | II | III | IV |
|---|---|---|---|---|
| 75 | " | " | 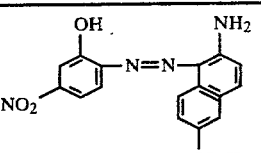 | brown |
| 76 | 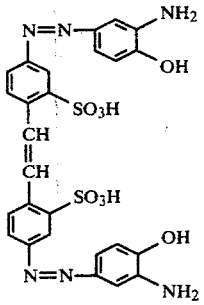 | 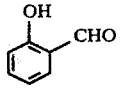 | 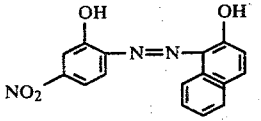 | dark brown |
| 77 | " | 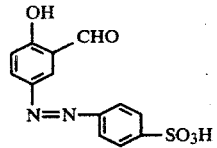 | 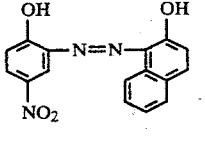 | brown |
| 78 | 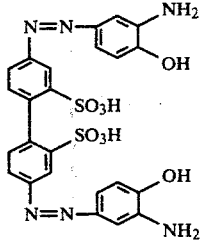 | 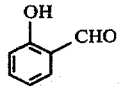 | 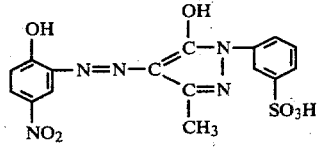 | orange |
| 79 | 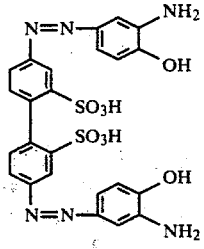 | 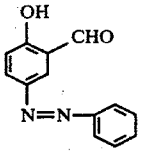 | 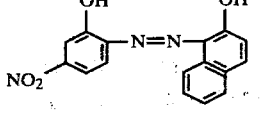 | olive-brown |
| 80 | " | " | 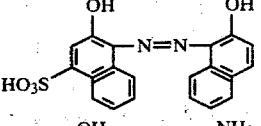 | olive-brown |
| 81 | " | " | 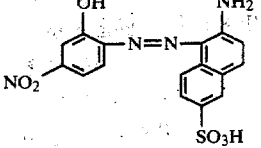 | brownish olive |

EXAMPLE 4

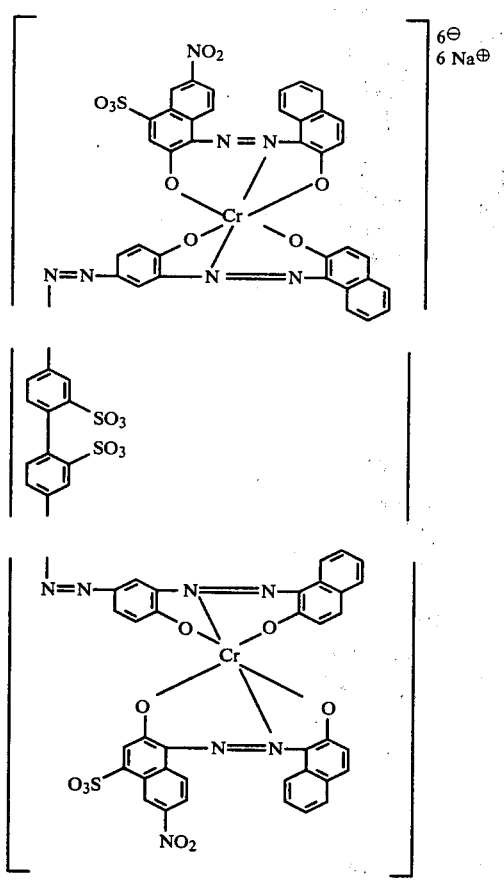

48.9 Parts of the 1:1 chromium complex corresponding to 5.2 parts of chromium and 43.9 parts of the monoazo dye obtained brom tiazotised 6-nitro-1-amino-2-hydroxynaphthalene-4-sulfonic acid and 2-hydroxynaphthalene are suspended in 750 parts by volume of ethylene glycol with 44.7 parts of the tetrazo dye obtained by coupling tetrazotiséd 4,4'-diaminodiphenyl-2,2'-disulfonic to 2-acetylamino-1-hydroxybenzene in alkaline medium and subsequently saponifying the acetylamino groups to amino groups in alkaline medium, diazotising the diamino compound and coupling it to 2-hydroxynaphthalene. The mixture is heated to 80°-85° C. while simultaneously raising the pH of the suspension to 7.5-8 with 5 N sodium hydroxide, and kept at this temperature and at constant pH with further 5 N sodium hydroxide until the starting materials can no longer be detected. The chromium-containing dye is precipitated with saturated sodium chloride solution, collected by filtration and dried. It is a dark powder which dissolves in water and dyes leather in brownish-black shades of good fastness properties.

EXAMPLE 5

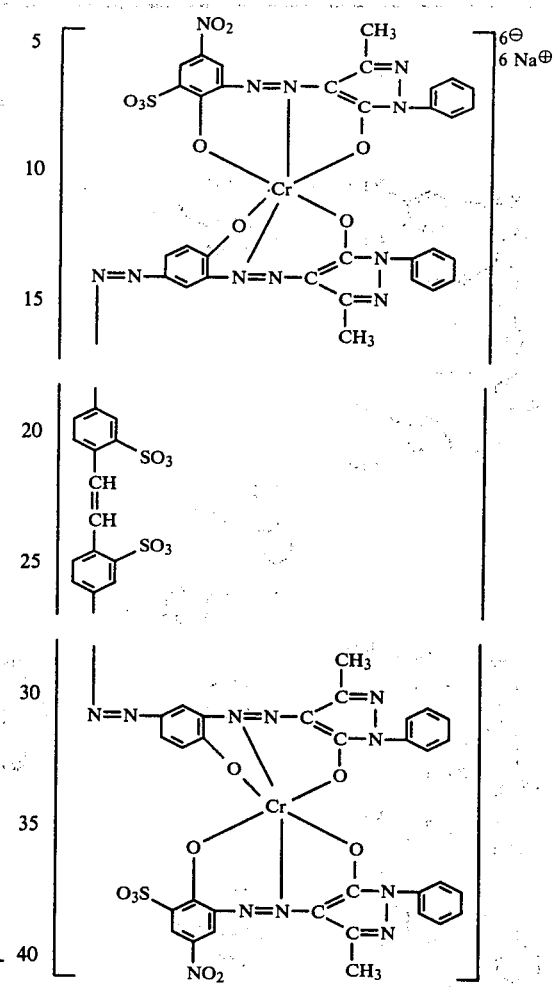

41.9 Parts of the monoazo dye obtained from diazotised 4-nitro-2-amino-1-hydroxybenzene-6-sulfonic acid and 1-phenyl-3-methyl-5-pyrazolone are stirred with 26.7 parts of chromium chloride hexahydrate in 750 parts by volume of ethylene glycol at 120°-125° C. until the starting compound can no longer be detected. To the resultant solution of the 1:1 chromium complex are then added, at 80°-85° C., 49 parts of the tetrazo dye obtained by coupling tetrazotised 4,4'-diaminostilbene-2,2'-disulfonic acid to 2-acetylamino-1-hydroxybenzene in alkaline medium and subsequently saponifying the acetylamino groups to amino groups in alkaline medium, diazotising the diamino compound and coupling it to 1-phenyl-3-methyl-5-pyrazolone, and the reaction mixture is kept at the above temperature until the addition reaction is complete. The pH of the reaction mixture is adjusted to 7-7.5 with 5 N sodium hydroxide solution and kept thereat. The chromium-containing dye is precipitated with saturated sodium chloride solution, collected by filtration and dried. It is a dark powder which dissolves in water to form a reddish-brown solution and dyes leather in reddish-brown shades of good fastness properties.

EXAMPLE 6

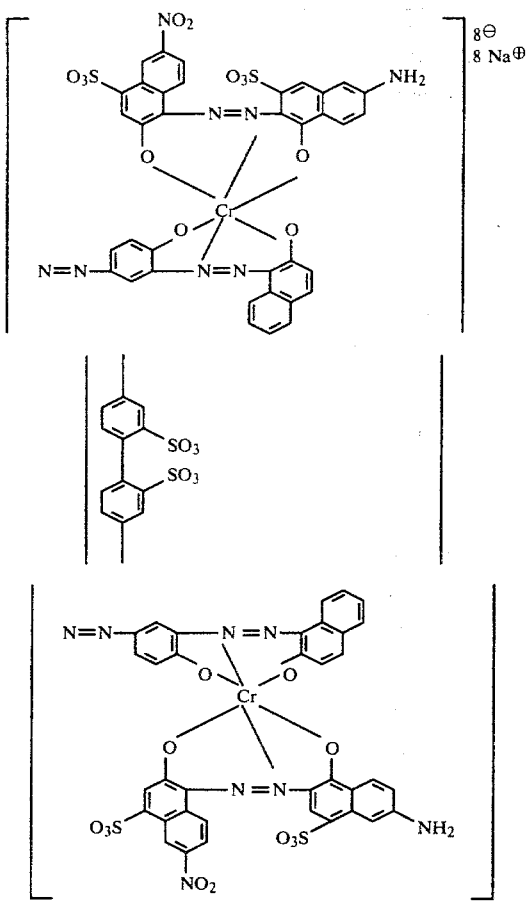

58.4 Parts of the 1:1 chromium complex corresponding to 5.2 parts of chromium and 53.4 parts of the monoazo dye obtained from diazotised 6-nitro-1-amino-2-hydroxynaphthalene-4-sulfonic acid and 2-amino-5-hydroxynaphthalene-7-sulfonic acid are suspended in 750 parts by volume of water with 44.7 parts of the tetrazo dye obtained by coupling tetrazotised 4,4'-diaminodiphenyl-2,2'-disulfonic acid to 2-acetylamino-1-hydroxybenzene and subsequently saponifying the acetylamino groups to amino groups, diazotising the diamino compound and coupling it to 2-hydroxynaphthalene. The mixture is heated to 80°–85° C. while simultaneously raising the pH of the reaction mixture to 7–7.5 with 5 N sodium hydroxide and keeping this temperature and a constant pH value with further 5 N sodium hydroxide until the starting materials can no longer be detected. The resultant chromium dye is then precipitated with sodium chloride, collected by filtration and dried. It is a dark powder which dissolves in water to form a greyish-black solution and dyes leather in black shades.

Table 2 lists further dyes of this invention which are obtained by reacting the 1:1 chromium complex of the azo or azomethine compounds of column III with the azo dye of column I, the tetrazotised diamino compound and 2 equivalents of the coupling component of column IV. These dyes colour leather in the shades indicated in column IV.

| No. | I | II | III | IV |
|---|---|---|---|---|
| 4 | " | " | [structure: 2-hydroxy-4-nitrophenyl-azo-(1-amino-2-naphthyl-6-sulfonic acid)] | black |
| 5 | " | " | [structure: 2-hydroxy-3,5-dinitrophenyl-azo-(1-amino-2-naphthyl-4-sulfonic acid)] | black |
| 6 | " | " | [structure: 2-hydroxy-3-sulfo-5-nitrophenyl-azo-pyrazolone with phenyl and CH₃] | brown |
| 7 | " | " | [structure: 2-hydroxy-3-sulfo-5-nitrophenyl-azo-acetoacetanilide] | brown |
| 8 | [structure: bis-azo biphenyl-2,2'-disulfonic acid with 3-amino-4-hydroxyphenyl groups] | " | [structure: 2-hydroxy-3-sulfo-5-nitrophenyl-azo-(2-hydroxy-5-pentylphenyl)] | brownish-black |
| 9 | " | " | [structure: 2-hydroxy-5-nitrophenyl-azo-(2-hydroxy-4,5-dimethylphenyl)] | brownish-black |
| 10 | [structure: stilbene-2,2'-disulfonic acid bis-azo with 3-amino-4-hydroxyphenyl] | [structure: acetoacetanilide] NH—CO—CH₂—CO—CH₃ | [structure: 2-hydroxy-3-sulfo-5-nitrophenyl-azo-pyrazolone with phenyl and CH₃] | brown |
| 11 | " | [structure: 2-chloro-acetoacetanilide] NH—CO—CH₂—CO—CH₃ with Cl | " | brown |
| 12 | " | [structure: 2-naphthol] | [structure: 2-hydroxy-3-sulfo-6-nitronaphthyl-azo-(2-hydroxy-1-naphthyl)] | brownish-black |
| 13 | " | " | [structure: 2-hydroxy-3-sulfo-5-nitrophenyl-azo-(2-hydroxy-1-naphthyl)] | brownish-black |

-continued

| No. | I | II | III | IV |
|---|---|---|---|---|
| 14 | " | " | (2-hydroxy-4-nitrophenyl)azo-(2-hydroxynaphthyl) | black |
| 15 | " | " | (2-hydroxy-5-nitrophenyl)azo-(2-hydroxynaphthyl) | brownish-black |
| 16 | " | " | nitro-sulfo-hydroxy-naphthyl azo amino-sulfo-hydroxy-naphthyl | black |
| 17 | " | " | sulfo-hydroxy-nitro-phenyl azo phenyl-methyl-pyrazolone | brown |
| 18 | " | 1-phenyl-3-methyl-5-pyrazolone | sulfo-hydroxy-nitro-naphthyl azo hydroxynaphthyl | reddish-brown |
| 19 | " | " | sulfo-hydroxy-nitro-phenyl azo hydroxynaphthyl | reddish-brown |
| 20 | " | " | (2-hydroxy-5-nitrophenyl)azo-(2-hydroxynaphthyl) | reddish-brown |
| 21 | 4,4′-bis[(3-amino-4-hydroxyphenyl)azo]-2,2′-biphenyldisulfonic acid | " | sulfo-nitro-hydroxy-naphthyl azo hydroxynaphthyl | brown |
| 22 | " | " | sulfo-hydroxy-nitro-phenyl azo phenyl-methyl-pyrazolone | brownish-orange |
| 23 | " | 2-naphthol | hydroxy-nitro-phenyl azo hydroxynaphthyl azo sulfophenyl | brownish-black |

Dyeing Procedure for Leather 100 parts of clothing suede leather (dry weight) are wet back at 50° C. for 2 hours in a solution of 1000 parts of water and 2 parts of 24% ammonia and subsequently dyed for 1 hour at 60° C. in a solution of 1000 parts of water, 2 parts of 24% ammonia and 6 parts of the dye of Example 1. A solution of 40 parts of water and 4 parts of 85% formic acid is then added and dyeing is continued for a further 30 minutes. The leather is then throughly rinsed and, if appropriate, treated for 30 minutes at 50° C. with 2 parts of a dicyandiamine/formaldehyde condensation product. Other kinds of suede leather as well as glove leather can be dyed in the same manner.

The resulting brown dyeings are distinguished by good fastness properties and good covering power.

What is claimed is:

1. A chromium complex dye which, in the form of the free acid, has the formula

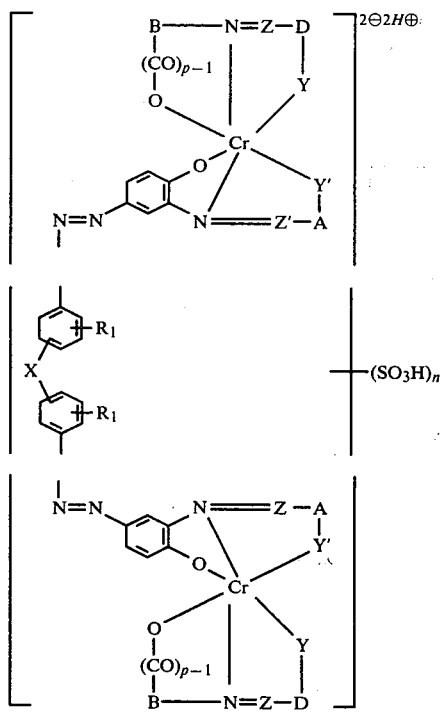

wherein

X is selected from the group consisting of a direct bond, methylene, $C_1-C_5$ alkylmethylene, phenylmethylene, 1,1-cyclohexylene, —O—, —S—, —NR'—, —SO—, —SO$_2$—, —CO—, —CO—CO—, —SO$_2$—NH—, —SO$_2$—NR'—SO$_2$—, —N=N—, —CH$_2$—CH$_2$— and —CH=CH—; R' is hydrogen or low molecular alkyl; each of Z and Z' independently is nitrogen or —CH—, p is 1 or 2, each of Y and Y' independently is oxygen or —NR—, wherein R is hydrogen or $C_1-C_5$ alkyl, with the proviso that if Z or Z' is —CH—, Y or Y' must be oxygen, R$_1$ is hydrogen or sulfo, carboxy, halogen, $C_1-C_5$ alkyl or $C_1-C_5$ alkoxy, B is phenyl or naphthyl which is unsubstituted or substituted by sulfo, $C_1-C_5$-alkyl, $C_1-C_5$-alkoxy, $C_1-C_5$-alkylsulfonyl, sulfamoyl, $C_1-C_5$ N-alkyl- or N,N-dialkylsulfamoyl, chlorine, bromine, nitro, cyano, phenylazo, sulfophenylazo, sulfonaphthylazo, sulfophenylazophenyleneazo, or sulfonaphthylazophenyleneazo, A is, if Z' is —CH—, o-phenylene which is unsubstituted or substituted by phenylazo, naphthylazo, phenylazophenyleneazo or naphthylazophenyleneazo, the phenyl or naphthyl groups being unsubstituted or substituted by sulfo, chlorine, bromine, nitro, methoxy methyl or ethyl, A—Y' is, if Z' is nitrogen, the radical of α- or β-naphthol which is unsubstituted or substituted by sulfo, the radical of 1-phenyl-3-methylpyrazol-5-one or the radical of acetoacetanilide, the two last-mentioned radicals being unsubstituted or substituted in the phenyl nucleus by sulfo, nitro, chlorine, bromine, $C_1-C_5$-alkyl or $C_1-C_5$-alkoxy, D is, if Z is —CH—, the radical of 2-hydroxy-1-naphthaldehyde or 1-hydroxy-2-naphthaldehyde or the o-phenylene radical which is unsubstituted or once or twice substituted by $C_1-C_5$-alkyl, halogen, sulfo, phenylazo, naphthylazo, phenylazophenyleneazo or naphthylazophenyleneazo, the phenyl or naphthyl groups being unsubstituted or substituted by sulfo, halogen, nitro, methoxy methyl or ethyl, D is, if Z is nitrogen, the radical of a phenol which couples in ortho-position to Y and which is unsubstituted or substituted by hydroxy, $C_1-C_5$ alkyl or $C_1-C_5$ alkoxy, the radical of a naphthol which is unsubstituted or substituted by amino, sulfo, chlorine, $C_1-C_5$-alkanoylamino, $C_1-C_5$-alkylsulfonylamino, $C_1-C_5$ alkoxycarbonylamino, aroylamino or arylsulfonylamino; the radical of a naphthylamine which is unsubstituted or substituted by sulfo, the radical of 1-aryl-3-methylpyrazol-5-one or the radical of an acetoacetanilide, the two last mentioned radicals being unsubstituted or substituted in the phenyl nucleus by sulfo, nitro, chlorine, bromine, $C_1-C_5$ alkyl or alkoxy, wherein aryl is naphthyl, naphthyl substituted by 1 to 3 sulfo groups, phenyl or phenyl which is substituted by chlorine, bromine, methyl, ethyl, methoxy, nitro or sulfo, and n is an integer from 1 to 10.

2. A chromium complex dye according to claim 1, in which the form of the free acid has the formula

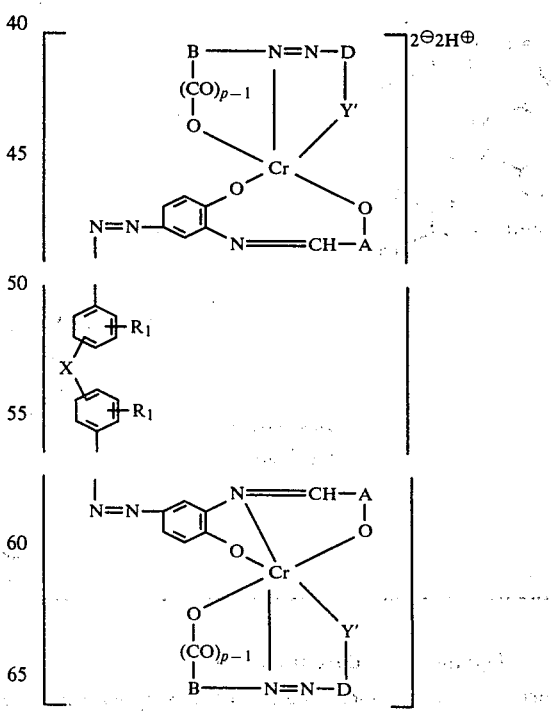

wherein X is a direct bond or a bridge of the formula wherein X is a direct bond or a bridge of the formula

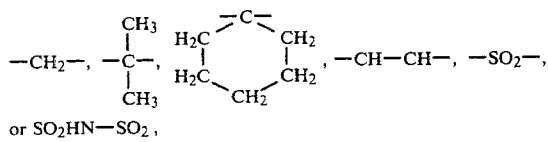

or SO₂HN—SO₂,

R₁ is hydrogen, sulfo, chlorine, methyl or methoxy, p is 1 or 2, A—O is o-phenylene which is unsubstituted or substituted by a phenylazo, naphthylazo, phenylazophenyleneazo or naphthylazophenyleneazo, the phenyl or naphthyl groups being unsubstituted or substituted by sulfo, chlorine, bromine, nitro, methoxy, methyl or ethyl, B is a phenyl or naphthyl which is unsubstituted or substituted by sulfo, C₁-C₅ alkyl or alkoxy, chlorine, bromine, nitro or cyano, phenylazo, sulfophenylazo, sulfonaphthylazo, sulfophenylazophenyleneazo, or sulfonaphthylazophenyleneazo, and D—Y' is the radical of a phenol which is unsubstituted or substituted by hydroxyl, C₁-C₅ alkyl or alkoxy, the radical of a naphthol which is unsubstituted or substituted by amino, sulfo, chlorine, C₁-C₅-alkanoylamino, C₁-C₅-alkylsulfonylamino, C₁-C₅ alkoxycarbonylamino, phenylamino or phenylsulfonylamino or of a naphthylamine which is unsubstituted or substituted by sulfo, the radical of a 1-phenyl-3-methyl-pyrazol-5-one or the radical of an acetoacetanilide, the two last mentioned radicals being unsubstituted or substituted in the phenyl nucleus by sulfo, nitro, chlorine, bromine, alkyl or alkoxy, provided that R₁, A, B and D-Y' are selected to contain a total of 1 to 10 sulfo groups.

3. A chromium complex dye according to claim 1 which, in the form of the free acid, has the formula

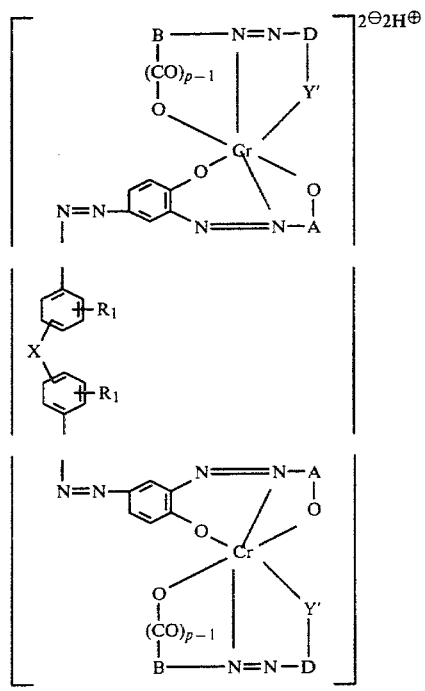

wherein X is a direct bond or a bridge of the formula

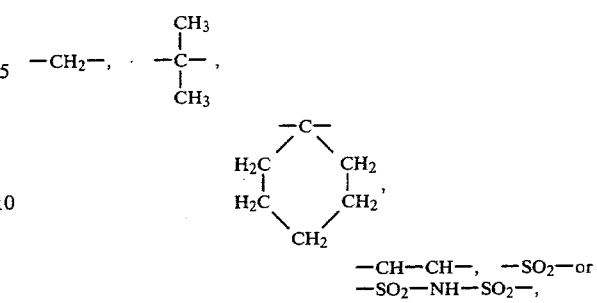

—CH—CH—, —SO₂— or —SO₂—NH—SO₂—,

R₁ is hydrogen, sulfo, chlorine, methyl or methoxy, p is 1 or 2, A—O is the radical of a naphthol which is unsubstituted or substituted by sulfo, the radical of a 1-phenyl-3-methylpyrazol-5-one or the radical of an acetoacetanilide, the two last-mentioned radicals are unsubstituted substituted in the phenyl nucleus by sulfo, nitro, chlorine, bromine, alkyl or alkoxy, B is a phenyl or naphthyl which is unsubstituted or substituted by sulfo, C₁-C₅ alkyl or alkoxy, chlorine, bromine, nitro or cyano, and D—Y' is the radical of a phenol which is substituted by hydroxyl, C₁-C₅ alkyl or alkoxy, the radical of naphthol which is unsubstituted or substituted by amino, sulfo, chlorine, C₁-C₅-alkanoylamino, C₁-C₅-alkylsulfonylamino, C₁-C₅-alkoxycarbonylamino, benzoylamino or phenylsulfonylamino or of a naphthylamine which is unsubstituted or substituted by sulfo, the radical of a 1-phenyl-3-methylpyrazol-5-one or the radical of an acetoacetanilide, the two last-mentioned radicals being able to be substituted in the phenyl nucleus by sulfo, nitro, chlorine, bromine, alkyl or alkoxy, provided that R₁, A, B and D—Y' are selected to contain a total of 1 to 10 sulfo groups.

4. A chromium complex dye according to claims 2 or 16, wherein X is a —SO₂—, cyclohexylene or vinylene bridge or a direct bond.

5. A chromium complex dye according to claims 2 or 16, wherein R₁ is hydrogen or sulfo.

6. A chromium complex dye according to claims 2 or 16, wherein B is phenyl or naphthyl which is substituted by nitro or sulfo or by nitro and sulfo.

7. A chromium complex dye according to claims 2 or 16, wherein the radical D—Y' is a naphthol radical which is unsubstituted or substituted by sulfo or by amino and sulfo, a phenol radical which is unsubstituted or substituted by C₁-C₅ alkyl, the acetoacetanilide or acetochloroanilide radical or a 1-phenyl-3-methyl-pyrazol-5-one radical which is unsubstituted or substituted in the phenyl nucleus by sulfo or chlorine or by sulfo and chlorine.

8. A chromium complex dye according to claim 3, wherein the radical A—O is a naphthol radical, the acetoacetanilide or acetochloroanilide radical or a 1-phenyl-3-methylpyrazol-5-one radical which is additionally substituted in the phenyl nucleus by sulfo or chlorine or by sulfo and chlorine.

9. A chromium complex dye according to claim 1, which contains 2 to 6 sulfo groups.

* * * * *

UNITED STATES PATENT AND TRADEMARK OFFICE
CERTIFICATE OF CORRECTION

PATENT NO. : 4,311,641

DATED : JANUARY 19, 1982

INVENTOR(S) : FABIO BEFFA

It is certified that error appears in the above—identified patent and that said Letters Patent is hereby corrected as shown below:

Claim 3, Column 46, line 21 reads:

"tuted substituted in the phenyl nucleus by sulfo, nitro,"

Should read:

-- tuted or substituted in the phenyl nucleus by sulfo, nitro,--

Signed and Sealed this

Twenty-seventh Day of April 1982

[SEAL]

Attest:

GERALD J. MOSSINGHOFF

*Attesting Officer*     *Commissioner of Patents and Trademarks*